(12) United States Patent
Kang (10) Patent No.: US 10,203,533 B2
(45) Date of Patent: Feb. 12, 2019

(54) DISPLAY DEVICE

(71) Applicant: LG DISPLAY CO., LTD., Seoul (KR)

(72) Inventor: ChangGong Kang, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 206 days.

(21) Appl. No.: 15/359,332

(22) Filed: Nov. 22, 2016

(65) Prior Publication Data
US 2017/0176806 A1    Jun. 22, 2017

(30) Foreign Application Priority Data

Dec. 16, 2015 (KR) .................. 10-2015-0180525

(51) Int. Cl.
*F21V 8/00* (2006.01)
*G02F 1/1333* (2006.01)

(52) U.S. Cl.
CPC ....... *G02F 1/133308* (2013.01); *G02B 6/009* (2013.01); *G02B 6/0083* (2013.01); *G02F 2001/13332* (2013.01); *G02F 2001/133311* (2013.01); *G02F 2001/133314* (2013.01); *G02F 2001/133322* (2013.01); *G02F 2001/133331* (2013.01); *G02F 2201/46* (2013.01)

(58) Field of Classification Search
CPC ... G02F 1/133308; G02F 2001/133311; G02F 2001/133331; G02F 2201/46; G02F 1/133305; G02F 2001/133314; G02F 2001/13332; G02F 2001/133322; G02F 2201/50
See application file for complete search history.

(56) References Cited

U.S. PATENT DOCUMENTS

| 6,565,763 | B1 | 5/2003 | Asakawa et al. |
| 8,821,000 | B2* | 9/2014 | Lee .................. G02F 1/133308 |
| | | | 362/611 |
| 8,848,130 | B2* | 9/2014 | Mathew ............ G02F 1/133308 |
| | | | 349/122 |
| 9,274,359 | B2* | 3/2016 | Qian ................. G02F 1/133308 |

(Continued)

OTHER PUBLICATIONS

Lang, S.B., et al.: "Review of some lesser-known applications of piezoelectric and pyroelectric polymers", Applied Physics A; Materials Science & Processing, vol. 85, No. 2, Sep. 1, 2006, pp. 125-134, XP019424468.

(Continued)

*Primary Examiner* — Peggy A Neils
(74) *Attorney, Agent, or Firm* — Dentons US LLP (57) ABSTRACT

A display device includes a display panel, a cover, a bonding member, a guide mold and at least one fastening member. The cover is above the display panel. The bonding member is on a surface of the cover and includes a plurality of non-recessed portions and a plurality of recessed portions between the plurality of non-recessed portions. The guide mold accommodates a light source below the display panel and includes a plurality of protruding portions protruding from a side surface thereof, each of the plurality of protruding portions respectively corresponding to each of the plurality of non-recessed portions. The at least one fastening member penetrates a corresponding one of the plurality of protruding portions of the guide mold to be fastened to a corresponding one of the plurality of recessed portions.

17 Claims, 6 Drawing Sheets

(56) References Cited

U.S. PATENT DOCUMENTS

| 9,426,909 | B2* | 8/2016 | Choi | H05K 5/0239 |
|---|---|---|---|---|
| 2010/0300862 | A1 | 12/2010 | Tamura et al. | |
| 2010/0328053 | A1 | 12/2010 | Yeh et al. | |
| 2017/0038515 | A1* | 2/2017 | Yuki | G02B 6/0036 |

OTHER PUBLICATIONS

Chen, D. et al.: "Microporous polyvinylidene fluoride film with dense surface enables efficient piezoelectric conversion", Applied Physics Letters, vol. 106, No. 19, May 11, 2015, XP012197380.

Ramandan, K. et al.: "A review of piezoelectric polymers as functional materials for electromechanical transducers", Smart Materials and Structures, vol. 23, No. 3, Jan. 20, 2014, XP020258249.

Jia, C.H. et al.: "Photoluminescence properties of porous InP filled with ferroelectric polymers", Applied Physics A Materials Science & Processing, vol. 111, No. 3, Apr. 30, 2013, XP035330612.

XP19424468: Lang et al. "Review of some lesser-known applications of piezoelectric and pyroelectric polymers", Applied Physics A Material Science and Processing, vol. 85, pp. 125-134, Sep. 1, 2006.

XP12197380: Chen et al, "Microporous polyvinylidene fluride film with dense surface enables efficient piezoelectric conversion," Applied Physics Letter vol. 106, No. 19, pp. 19390-1 to 193901-5, May 11, 2015.

XP020258249: Ramadan et al. "A review of piezoelectric polymers as functional materials for electromechanical transducers", Smart Materials and Structures, IOP Publishing Ltd, Bristol GB, vol. 23, No. 3, p. 33001 (26 pages) Jan. 20, 2014.

XP35330612: Jia et al., "Photoluminescence properties of porous InP filled with ferroelectric polymers" Applied Physics A Material Science and Processing, vol. 111, pp. 695-699, Apr. 30, 2013.

XP55063410: Ahmad, Zulkifli, "Polymeric Dialectric Materials" "Dialectric Material" InTech, chapter 1, Oct. 3, 2012.

* cited by examiner

DISPLAY DEVICE

CROSS-REFERENCE TO RELATED APPLICATIONS

This application claims the priority of Korean Patent Application No. 10-2015-0180525 filed on Dec. 16, 2015, in the Korean Intellectual Property Office, the disclosure of which is incorporated herein by reference.

BACKGROUND

Technical Field

The present disclosure relates to a display device. More specifically, the present disclosure relates to a display device with improved reliability by way of suppressing introduction of foreign matter Description of the Related Art A conventional display device such as a liquid-crystal display (LCD) device may display images in such a manner that a light source is disposed below a liquid-crystal layer and an electric field is applied across the liquid-crystal layer to align the orientation of liquid-crystal molecules in the liquid crystal layer so that the transmittance of light emitted from the light source is adjusted. Such display devices are employed in a variety of electronic devices such as smart phones, tablet PCs, etc. A display device also includes a display panel, and a backlight unit illuminating light to the display panel. The display panel and the backlight unit are assembled into a module. A cover glass is attached on the upper surface of the display panel, and a printed circuit board (PCB) is attached on the lower surface of the backlight unit, thereby producing a display device.

Recently, to improve the design of display devices while reducing the size, research efforts are ongoing to develop slimmer display devices. As the display devices become slimmer, however, adhesion space available for coupling the cover glass, the display panel, the backlight unit and the PCB is being reduced.

Specifically, the display panel may be accommodated in a guide mold of the backlight unit, and the guide mold may be attached on the bottom surface of the cover glass along the periphery of the cover glass. The PCB is coupled with the guide mold, and the display panel is connected to the PCB disposed on the bottom surface of the guide mold via a flexible printed circuit board (FPCB).

The guide mold is attached to the cover glass by an adhesion member. However, as display devices become thinner, the accommodation space of the backlight unit is reduced, the thickness of the guide mold is reduced to optimize the accommodation space, and thus the area by which the guide mold is attached to the cover glass is also reduced. As a result, the adhesive force of the adhesion member may become weaker. Accordingly, the guide mold can often get detached from the cover glass, and foreign matter can be introduced through a gap formed as the guide mold is detached from the cover glass, and the reliability of the display device can be reduced.

SUMMARY

As display devices become thinner, the space for attaching the guide mold of the backlight unit to the cover glass is reduced, and thus the guide mold can be detached from the cover glass. To address the above technical problems, the present disclosure includes a display device capable of suppressing a guide mold from being detached from a cover glass by coupling the guide mold with the cover glass using screws to enhance adhesion between the guide mold and the cover glass.

An object of the present disclosure is to provide a display device capable of greatly suppressing the problem of foreign matter being introduced into the device via a gap that may result when the guide mold is detached from the cover glass by coupling the guide mold with the cover glass with screws.

Another object of the present disclosure is to provide a display device capable of reducing a spacing that may result when an FPCB is detached from a bonding member to suppress foreign matter from permeating into the device by tightly attaching the FPCB of the display panel using a filling member disposed between the guide mold and the bonding member.

Objects of the present disclosure are not limited to the above-described objects, and other objects of the present disclosure will be apparent to those skilled in the art from the following descriptions.

According to an aspect of the present disclosure, a display device may include a display panel, a cover above the display panel, a bonding member on a surface of the cover and comprising a plurality of non-recessed portions spaced apart from one another and a plurality of recessed portions between the plurality of non-recessed portions, a guide mold configured to accommodate a light source below the display panel and comprising a plurality of protruding portions protruding from a side surface thereof, each of the plurality of protruding portions corresponding respectively to each of the plurality of non-recessed portions, and at least one first fastening member penetrating a corresponding one of the plurality of protruding portions of the guide mold to be fastened to a corresponding one of the plurality of non-recessed portions. Because the display device according to the exemplary embodiment includes at least one first fastening member for coupling the guide mold with the bonding member, the guide mold and the bonding member can be securely coupled with each other, and introduction of foreign matter caused when the guide mold is detached from the bonding member or cover glass can be effectively suppressed.

According to another aspect of the present disclosure, a display device may include a cover, a display panel under the cover, including a flexible printed circuit board (FPCB) extending outward from one side of the display pane, a bonding member under the cover surrounding the display panel, comprising one side with alternating recessed portions and non-recessed portions, a guide mold under the bonding member surrounding a light source, the guide mold comprising a first top surface of one side having a lower height than a second top surface contacting a bottom surface of the bonding member, the one side including alternating protruding portions and non-protruding portions, wherein the non-recessed portions of the bonding member correspond with the protruding portions of the guide mold, and wherein the recessed portions of the bonding member correspond with the non-protruding portions of the guide mold.

Particulars of the exemplary embodiments of the present disclosure will be described in the detail with reference to the accompanying drawings.

According to an exemplary embodiment of the present disclosure, adhesion between a cover glass and a guide mold can be improved by using a plurality of screws, each penetrating a protruding portion of the guide mold to be fastened to a non-recessed portion, and thereby a defect caused from foreign matter penetrating into the device when the cover glass is detached from the guide mold can be reduced.

In addition, according to an exemplary embodiment of the present disclosure, an FPCB can be tightly attached to a bonding member by using a filling member, to suppress permeation of foreign matter that may occur via a gap between the FPCB and the bonding member.

Effects of the present disclosure are not limited to those described above and other effects of the present disclosure will be apparent to those skilled in the art from the following descriptions.

BRIEF DESCRIPTION OF THE DRAWINGS

The above and other aspects, features and other advantages of the present disclosure will be more clearly understood from the following detailed descriptions in conjunction with the accompanying drawings, in which.

DETAILED DESCRIPTION OF THE PREFERRED EMBODIMENT

Advantages and features of the present disclosure and methods to achieve them will become apparent from the descriptions of exemplary embodiments hereinbelow with reference to the accompanying drawings. However, the present disclosure is not limited to the exemplary embodiments disclosed herein and may be implemented in other ways. The exemplary embodiments are provided for making the disclosure of the present disclosure thorough and for fully conveying the scope of the present disclosure to those skilled in the art. It is to be noted that the scope of the present disclosure is defined only by the claims.

The figures, dimensions, ratios, angles, and numbers of elements in the drawings are merely illustrative and are not limiting. Like reference numerals denote like elements throughout the descriptions. Further, in describing the present disclosure, descriptions on well-known technologies may be omitted in order not to unnecessarily obscure the gist of the present disclosure. The terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In descriptions of elements, elements should be interpreted as including error margins even no such explicit statements are present.

In descriptions of positional relationships, such as "an element A on an element B," "an element A above an element B," "an element A below an element B," and "an element A next to an element B," another element, e.g. element C, may be disposed between the elements A and B unless the term "directly" or "immediately" is explicitly used.

As used herein, a phrase such as "an element A on an element B" may denote that the element A may be disposed directly on the element B and/or the element A may be disposed indirectly on the element B via another element C.

The terms first, second and the like in the descriptions and in the claims are used for distinguishing between similar elements and not necessarily for describing a sequential or chronological order. These terms are used to merely distinguish one element from another. Accordingly, as used herein, a first element may be a second element within the technical idea of the present disclosure.

Like reference numerals denote like elements throughout the descriptions.

The drawings are not necessarily to scale and the relative dimensions of various elements in the drawings are depicted schematically and not necessarily to scale.

Features of various exemplary embodiments of the present disclosure may be combined partially or totally. As will be clearly appreciated by those skilled in the art, various technically interactions and operations are possible. Various exemplary embodiments can be practiced individually or in combination.

Hereinafter, exemplary embodiments of the present disclosure will be described in detail with reference to the accompanying drawings.

Figure 1:
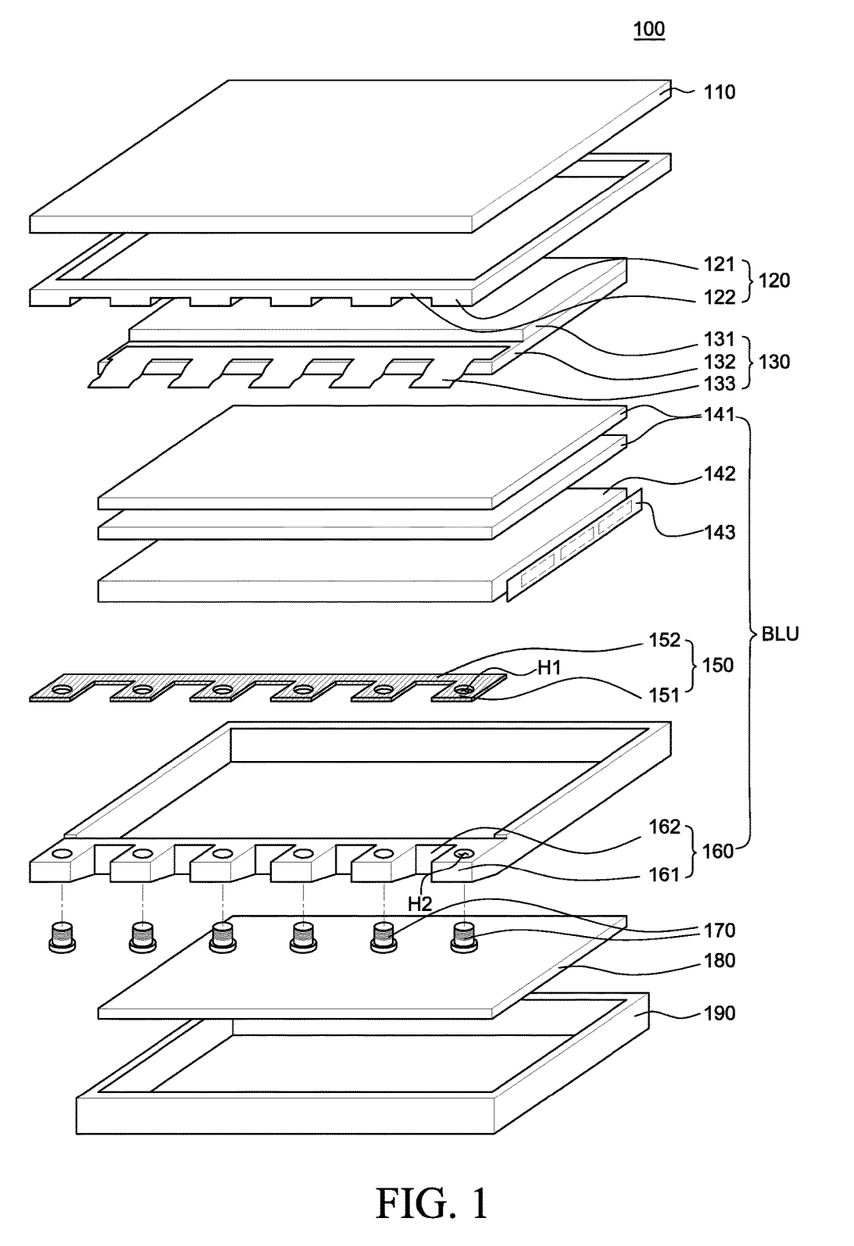
FIG. 1 is an exploded perspective view of a display device according to an exemplary embodiment of the present disclosure.

FIG. 1 is an exploded perspective view of a display device according to an exemplary embodiment of the present disclosure. Referring to FIG. 1, the display device 100 includes a cover which may be a cover glass 110, a bonding member 120, a display panel 130, a backlight unit BLU, a PCB 180, a cover shield 190 and at least a first fastening member, which is illustrated in FIG. 1 as a plurality of screws 170.

The cover glass 110 covers the display panel 130 and the backlight unit BLU to protect the elements of the display panel 130 and the backlight unit BLU from external impact, foreign matter or moisture. For example, the cover glass 110 may be made of glass having good rigidity or plastic that can be thermally formed and easily processed.

The bonding member 120 is attached on the bottom surface of the cover glass 110 and coupled with a guide mold 160 of the backlight unit BLU. For example, the bonding member 120 is fastened to the guide mold 160 of the backlight unit BLU by the plurality of screws 170 to thereby couple the backlight unit BLU with the cover glass 110. How the bonding member 120 is fastened to the guide mold 160 will be described in detail below with reference to FIGS. 4 and 5.

The bonding member 120 has a shape such that it surrounds the periphery of the cover glass 110. The display panel 130 is disposed on the inner side of the bonding member 120.

The bonding member 120 has a plurality of recessed portions 122 and a plurality of non-recessed portions 121. Each of the recessed portions 122 are spaced apart from one another, and each of the non-recessed portions 121 is formed between two adjacent recessed portions 122. The thickness of the non-recessed portions 121 is greater than that of the recessed portions 122. Accordingly, the bonding member 120 has at least one grooved side surface, and has at least one bottom surface having a step difference created by the plurality of recessed portions 122 and the plurality of non-recessed portions 121.

The display panel 130 includes an upper substrate 131, a lower substrate 132 and an FPCB 133. The lower substrate 132 supports a variety of elements of the display panel 130. Thin-film transistors (TFTs), pixel electrodes electrically connected to the thin-film transistors, and common electrodes opposed to the pixel electrodes are disposed on the lower substrate 132. In this light, the lower substrate 132 may also be referred to as a TFT substrate. A thin-film transistor forms an electric field between a pixel electrode and a common electrode based on a driving signal delivered via a line.

The upper substrate 131 faces the lower substrate 132. The upper substrate 131 supports a color filter layer and, in this light, may also be referred to as a color filter substrate. The color filter layer selectively transmits light of a particular wavelength, and an image of full color is displayed via the color filter layer.

The FPCB 133 provides a variety of signals to the display panel 130 and is connected to the lower substrate 132 of the display panel 130. The FPCB 133 may include a drive IC for driving the display panel 130. The drive IC may be a chip-on-film (COF) type and may be attached to a surface of the FPCB 133.

The FPCB 133 passes through between every two non-recessed portions 121 of the bonding member 120. Specifically, the display panel 130 may be disposed on the inner side of the bonding member 120, and the FPCB 133 may be extended out of the bonding member 120 between every two non-recessed portions 121. A surface of the FPCB 133 may come in contact with a surface of the recessed portions 122.

The plurality of non-recessed portions 121 of the bonding member 120 may be spaced apart from one another to have physical space therebetween for allowing the FPCB 133 to pass. The distance between adjacent non-recessed portions 121 may equal the width of the FPCB 133 extensions.

The backlight unit BLU is disposed under the display panel 130 and emits light toward the display panel 130. The backlight unit BLU includes a light source unit 143, a light guide plate 142, optical sheets 141, a filling member 150 and a guide mold 160.

The light source unit 143 generates light and may include light-emitting diodes (LEDs) and a driving circuit for driving the LEDs. However, this is not limiting. The light source unit 143 may include cold cathode fluorescent lamps (CCFLs) or external electrode fluorescent lamps, in place of the LEDs. Although FIG. 1 shows an edge light source unit 143, the light source unit 143 may be a bottom light source unit.

The light guide plate 142 diffuses or collimates light emitted from the light source unit 143 to propagate it toward the lower substrate 132 of the display panel 130. The light guide plate 142 may have a plate-like shape as shown in FIG. 1 or may have a wedge-like shape.

The optical sheets 141 are disposed on the light guide plate 142 and enhance the luminance of the light generated from the light source unit 142. The optical sheets 141 may include a diffusion sheet, a prism sheet, etc.

The guide mold 160 accommodates the optical sheets 141, the light guide plate 142 and the light source unit 143 and forms the exterior of the backlight unit BLU. In addition, the guide mold 160 accommodates the display panel 130. Accordingly, the display panel 130 and the backlight unit BLU may be configured as a module by the guide mold 160. The guide mold 160 has an open square shape and accommodates the light source unit 143, the light guide plate 142, the optical sheets 141 and the display panel 130.

The guide mold 160 may be made of plastic so that it can be easily formed by injection molding. The color of the plastic may be dark to suppress and prevent light generated from the light source unit 143 from leaking.

A plurality of protruding portions 161 are formed on a side surface of the guide mold 160. The protruding portions 161 correspond to the non-recessed portions 121 of the bonding member 120, respectively. The protruding portions 161 are spaced apart from one another, and each of a plurality of non-protruding portions 162 is formed between two adjacent protruding portions 161. Accordingly, the guide mold 160 has at least one grooved side surface.

Each of the protruding portions 161 has an insertion hole H2. The screws 170 are each inserted into the respective insertion holes H2 formed in the protruding portions 161 and penetrate the protruding portions 161 to be fastened to the respective non-recessed portions 121 of the bonding member 120.

The filling member 150 is disposed on a surface of the guide mold 160 and includes a plurality of first portions 151 and a plurality of second portions 152. The first portions 151 of the filling member 150 correspond to the protruding portions 161 of the guide mold 160, respectively. Specifically, each of the first portions 151 covers a surface of the respective protruding portions 161. The second portions 152 of the filling member 152 correspond to the non-protruding portions 162 of the guide mold 160, respectively.

The guide mold may include a first top surface of one side where the protruding and non-protruding portions are located. The first top surface may have a lower height than a second top surface that contacts a bottom surface of the bonding member, which may create a space or a gap between the bonding member and the guide mold. This space or gap may allow the filling member to be fitted between the bonding member and the guide mold. The filling member 150 may fill the space between the bonding member 120 and the guide mold 160 to tightly attach the protruding portions 161 to the non-recessed portions 121 of the bonding member 120. The filling member 150 may also fill the space between the bonding member 120 and the guide mold 160 to tightly attach the non-protruding portions 162 to the recessed portions 122. The functionality of the filling member 150 will be described in more detail below with reference to FIG. 4.

An opening H1 is formed in each of the first portions 151 of the filling member 150. As the first portions 151 correspond to the protruding portions 161 of the guide mold 160, respectively, the openings H1 of the first portions 151 correspond to the insertion holes H2 of the protruding portions 161, respectively.

The screws 170 penetrate the protruding portions 161 of the guide mold 160 to be inserted into the non-recessed portions 121 of the bonding member 120, respectively. That is, the screws 170 pass through the insertion holes H2 formed in the protruding portions 161 and the openings H1 formed in the first portions 151 of the filling member 150, respectively, and are inserted into the non-recessed portions 121 of the bonding member 120, respectively.

The guide mold 160 may be coupled with the cover glass 110 by the screws 170 and accordingly the backlight unit BLU and the display panel 130 may be coupled with the cover glass 110. The screws 170 will be described in more detail below with reference to FIG. 5.

The PCB 180 is disposed under the backlight unit BLU. Specifically, the PCB 180 is attached to the bottom surface of the guide mold 160. A variety of elements for controlling the display panel 130 are disposed on the PCB 180. For example, a graphic controller for providing image data to the display panel 130, a timing controller for controlling a drive IC of the display panel 130, etc., may be disposed on the PCB 180.

The PCB 180 is connected to the FPCB 133 to transmit a variety of signals to the display panel 130. For example, the FPCB 133 may pass through between the non-recessed portions 122 of the bonding member 120 to be extended out of the bonding member 120 and may be bent between adjacent protruding portions 161 of the guide mold 160 to be connected to the PCB 180. The way how the FPCB 133 is connected to the PCB 180 will be described in detail with reference to FIG. 2. The cover shield 190 is disposed on the bottom surface of the PCB 180 and protects the PCB 180 from external environment. The cover shield 190 has a space larger than the guide mold 160 and may cover the bottom surface of the PCB 180 and the side surfaces of the guide mold 160. The cover shield 190 may be coupled with the guide mold 160 by cover screws, which will be described in detail below with reference to FIGS. 6A and 6B.

Figure 2:
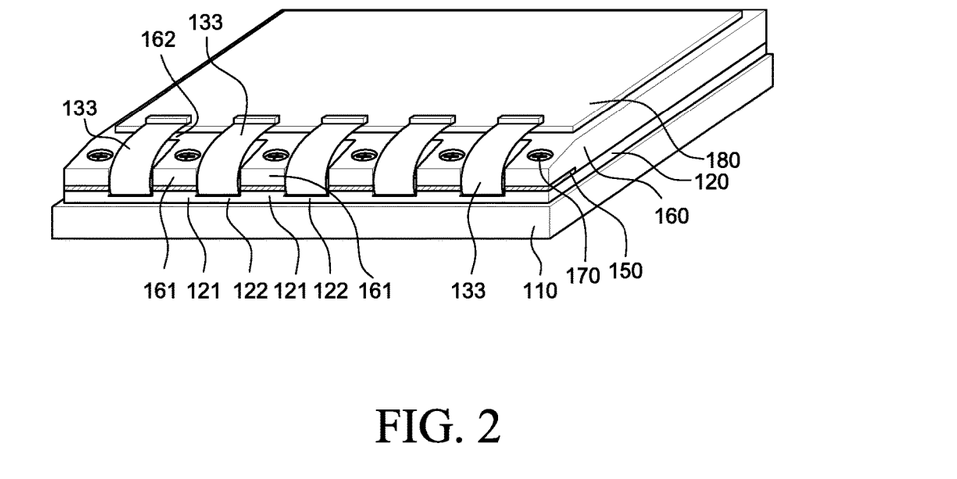
FIG. 2 is an assembled perspective view of a display device according to an exemplary embodiment of the present disclosure.

FIG. 2 is an assembled perspective view of a display device according to an exemplary embodiment of the present disclosure. For convenience of illustration, FIG. 2 shows an assembled perspective view of the display device 100 when viewed from the bottom surface. The cover shield 190 is not shown in FIG. 2. In the following description, the top surface and the bottom surface are referenced to the display device shown in FIG. 1. Accordingly, a surface facing the top of FIG. 2 is referred to as a bottom surface, while a surface facing the bottom of FIG. 2 is referred to as a top surface. Referring to FIG. 2, the bonding member 120 is attached on the bottom surface of the cover glass 110, and the guide mold 160 is disposed on the bottom surface of the bonding member 120. As described above, the FPCB 133 is extended from the display panel disposed on the inner side of the guide mold 160 and passes through between the non-recessed portions 121 of the bonding member 120 to be extended out of the guide mold 160. As the non-recessed portions 121 of the bonding member 120 are thicker than the recessed portions 122 thereof, there may be step difference between the non-recessed portions 121 and the recessed portions 122. Accordingly, there may be gaps therebetween due to the step difference. The FPCB 133 passes through the gaps and may be extended out of the guide mold 160.

The top surface of the guide mold 160 faces the bottom surface of the bonding member 120. As the guide mold 160 has a grooved side surface formed by the protruding portions 161 and the non-protruding portions 162, there is provided a space between the protruding portions 161, through which the FPCB 133 extensions can be bent. Accordingly, the FPCB 133 extensions may be bent between the protruding portions 161 to connect stably to the PCB 180 stably.

The filling member 150 may be disposed between the bonding member 120 and the guide mold 160 to attach the bonding member 120 tightly to the guide mold 160 or to attach the FPCB 133 tightly to a surface of the bonding member 120. The filling member 150 will be described in detail with reference to FIGS. 3 and 4.

Figure 3:
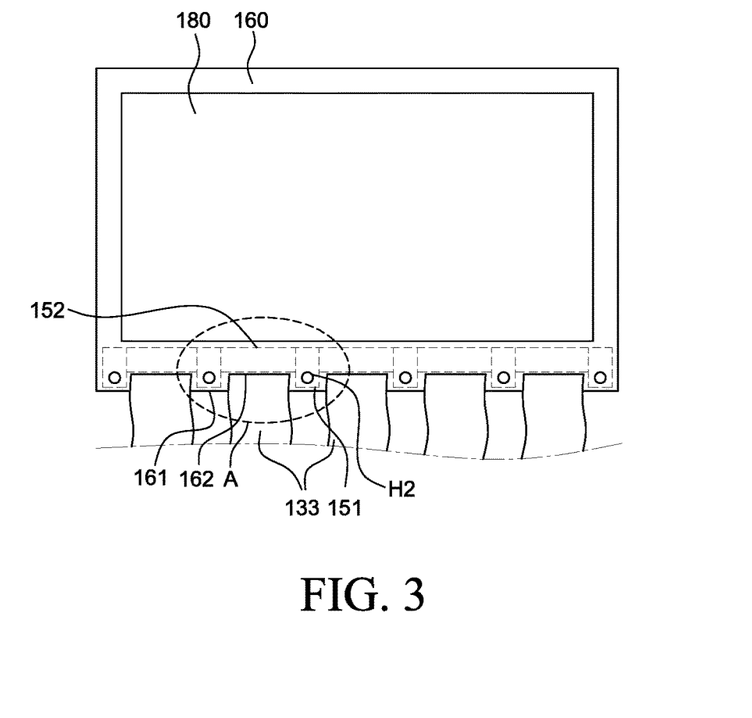
FIG. 3 is a schematic plan view for illustrating a display device according to an exemplary embodiment of the present disclosure.
Figure 4:
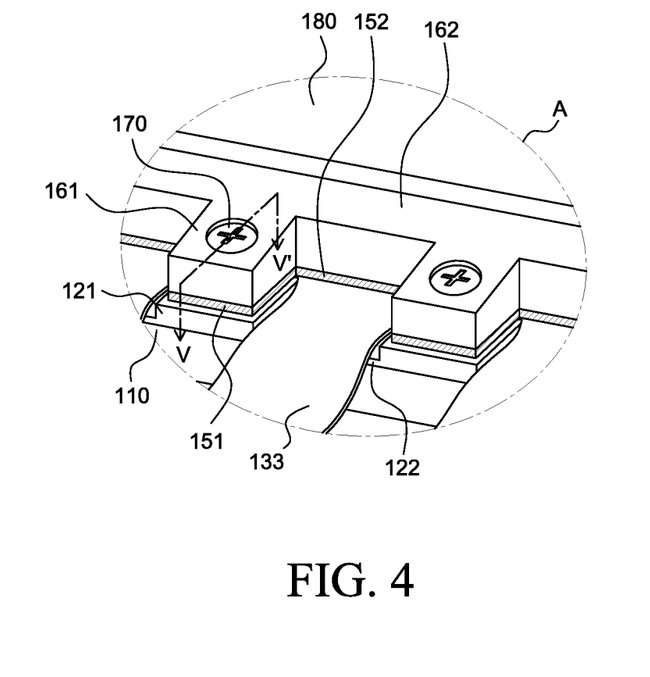
FIG. 4 is an enlarged perspective view of area A of FIG. 3 for illustrating a display device according to an exemplary embodiment of the present disclosure.

FIG. 3 is a schematic plan view for illustrating a display device according to an exemplary embodiment of the present disclosure. FIG. 4 is an enlarged perspective view of area A of FIG. 3 for illustrating a display device according to an exemplary embodiment of the present disclosure. In FIGS. 3 and 4, the FPCB 133 is shown separated from the PCB 180, and the cover shield 190 is not shown.

Referring to FIG. 3, the filling member 150 is disposed on a surface of the guide mold 160. The filling member 150 includes the first portions 151 corresponding to the protruding portions 161, respectively, and the second portions 152 corresponding to the non-protruding portions 162, respectively. The opening H1 is formed in each of the first portions 151. The screws 170 pass through the openings H1 of the filling member 150 to be inserted into the non-recessed portions 121, respectively.

Referring to FIG. 4, the first portions 151 of the filling member 150 fills the space between the protruding portions 161 and the non-recessed portions 121, and the second portions 152 of the filling member 150 fills the space between the non-protruding portions 162 and the recessed portions 122.

The first portions 151 and the second portions 152 of the filling member 150 may be made of different materials. For example, the first portions 151 of the filling member 150 may be made of an adhesive material, and the second portions 152 of the filling member 150 may be made of an elastic material.

If the first portions 151 are made of an adhesive material, the first portions 151 may work as an adhesive for attaching the protruding portions 161 to the non-recessed portions 121. The first portions 151 protrude from the second portions 152 and thus have a larger contact area than the second portions 152. If the first portions 151 are made of an adhesive material, the protruding portions 161 of the guide mold 160 may attach to the non-recessed portions 121 of the bonding member 120 through a large contact area, and thus adhesion between the backlight unit BLU and the cover glass 110 can be enhanced.

In addition, if the second portions 152 of the filling member 150 are made of an elastic material, the second portions 152 may work as shielding members for blocking introduction of foreign matter. As described above, there may be gaps between the non-recessed portions 121 due to the step difference, and the flexible PCB 133 may be extended out of the bonding member 120 via the gaps. If the step difference between the non-recessed portions 121 and the recessed portions 122 is larger than the thickness of the FPCB 133, there may be a fine gap between the FPCB 133 and the recessed portions 122. When such a fine gap is present, foreign matter may be introduced into the display device via the fine gap between the FPCB 133 and the recessed portions 122, and as a result the reliability of the display panel 130 on the inner side of the guide mold 160 may be degraded by the foreign matter. When the second portions 152 of the filling member 150 are made of an elastic material, however, the FPCB 133 can be tightly attached to the surface of each of the recessed portions 122, and thus the fine gap can be suppressed. As a result, the path via which foreign matter may be introduced into the device is blocked, and reliability of the display panel 130 can be improved.

According to some embodiments of the present disclosure, the first portions 151 and the second portions 152 of the filling member 150 may be made of the same material. For example, the first portions 151 and the second portions 152 may be made of an elastic material. If both of the first portions 151 and the second portions 152 are made of an elastic material, the first portions 151 may work as a shock-absorbing member between the protruding portions 161 of the guide mold 160 and the non-recessed portions 121 of the bonding member 120 to mitigate pressure resulting from the screws 172, thereby enhancing airtightness between the protruding portions 161 and the non-recessed portions 121. This effect and configuration will be described in more detail with reference to FIG. 5.

Figure 5:
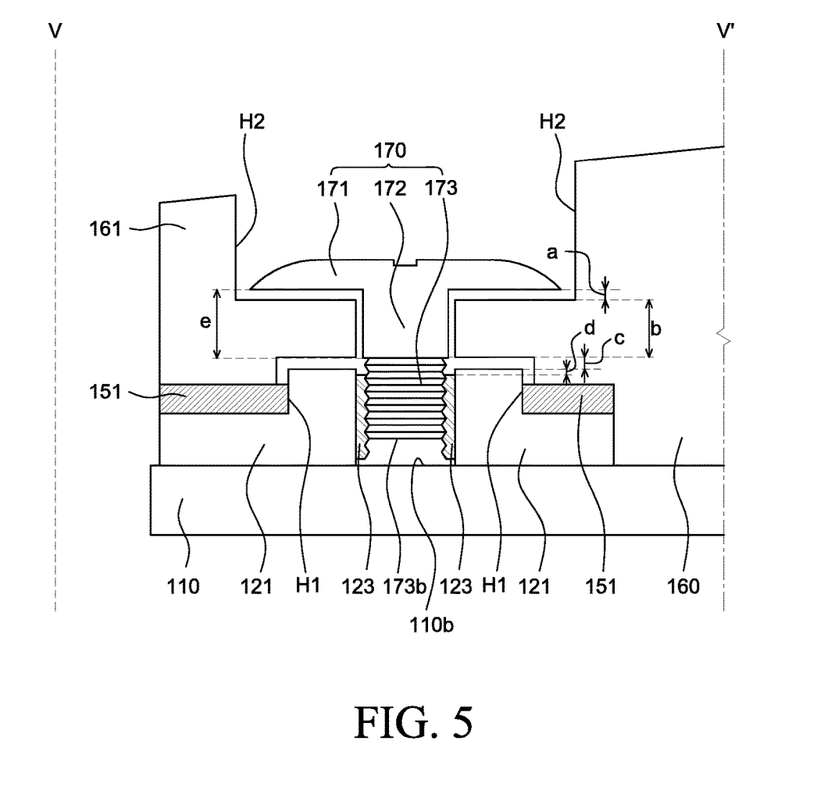
FIG. 5 is a cross-sectional view of a display device according to an exemplary embodiment of the present disclosure, taken along line V-V' of FIG. 4.

FIG. 5 is a cross-sectional view of a display device according to an exemplary embodiment of the present disclosure, taken along line V-V' of FIG. 4. Referring to FIG. 5, the guide mold 160 and the bonding member 120 are coupled with each other by a screw 170.

The screw 170 includes a head 171, a shoulder 172 and a thread 173. The head 171 has a standardized groove in which a driver can be inserted. The head 171 has a diameter larger than that of the shoulder 172 and the thread 173. The head 171 can be inserted into the insertion hole H2 of the protruding portion 161 but not into the non-recessed portion 121. That is, the diameter of the insertion hole H2 of the protruding portion 161 is larger than the diameter of the head 171 of the screw 170, and the diameter of the insertion hole of the non-recessed portion 121 is smaller than the diameter of the head 171. Accordingly, the head 171 of the screw is not inserted into the non-recessed portion 121.

The shoulder 172 can be inserted into the insertion hole H2 of the protruding portion 161 but cannot be inserted into the non-recessed portion 121. That is, the shoulder 172 cannot be screwed into a nut 123, and the nut 123 is not fastened to the shoulder 172.

The thread 173 passes through the insertion hole H2 of the protruding portion 161 to be inserted into the non-recessed portion 121 and is screwed into and fastened to the nut 123 of the non-recessed portion 121. The nut 123 of the non-recessed portion 121 is inserted into the non-recessed portion 121 to be engaged with the thread 173.

The nut 123 of the non-recessed portion 121 may have a height larger than that of the thread 173 so that a surface 173b of the thread does not come in contact with a surface 110b of the cover glass facing the surface 173b. The shoulder 172 is not engaged with the nut 123, and thus the thread 173 can be spaced apart from the cover glass 110 even when the screw 170 is fully inserted. If the surface 173b of the thread comes in contact with the surface 110b of the cover glass, stress may be exerted on the cover glass 110 during the process of fastening the screw 170 to the non-recessed portion 121, such that the cover glass 110 can be damaged. If the surface 173b of the thread is spaced apart from the surface 110b of the cover glass, however, no stress is exerted on the cover glass 110 during the process of fastening the screw 170 to the non-recessed portion 121, such that damage to the cover glass 110 can be suppressed.

The first portion 151 of the filling member 150 is disposed between the protruding portion 161 and the non-recessed portion 121, thereby mitigating stress exerted on the protruding portion 161 by the screw 170. Specifically, if the screw 170 is inserted into the non-recessed portion 121 too deeply, the head 171 of the screw 170 may press the protruding portion 161 such that stress may be exerted on the protruding portion 161. As the guide mold 160 is made of a plastic material as described above, when stress is exerted on a part of the guide mold 160, it may be deformed. As the guide mold 160 is deformed, a part of the guide mold 160 may be detached from the cover glass 110, such that foreign matter may be introduced via the detached part. In addition, if the screw 170 is inserted into the non-recessed portion 121 too deeply such that strong stress is exerted on the guide mold 160, the guide mold 160 may be broken. If the first portions 151 of the filling member 150 is made of an elastic material, the first portions 151 may work as shock-absorbing members between the protruding portions 161 and the non-recessed portions 121 for absorbing the stress caused by the screw 170, thereby suppressing and preventing the deformation or breaking of the guide mold 160. As a result, the guide mold 160 can be fastened stably to the non-recessed portions 121.

The shoulder 172 of the screw 170 has a predetermined height (e). The height (e) of the shoulder 172 may be determined to complement for deviations in the height of the guide mold 160 that may exist from processing errors. For example, the height (e) of the shoulder 172 may be smaller than the distance from the bottom surface of the head 171 to the surface of the nut 123 facing the bottom surface of the head 171 when the screw is fully fastened to the nut in an ideal situation with no processing errors. Specifically, a variety of errors may occur during the processes of forming the protruding portions 161 of the guide mold 160 and the non-recessed portions 121 of the bonding member 120. For example, a fine processing error (a) may occur between the bottom surface of the head 171 of the screw 170 and the insertion hole inside the protruding portion 161. In addition, a fine processing error may occur in a thickness (b) of the insertion hole inside the protruding portion 161. Further, a fine processing error (c) may occur between the insertion hole inside the protruding portion 161 and the surface of the non-recessed portion 121, and a fine processing error (d) may occur during the process of inserting the nut 123 into the non-recessed portion 121. The sum of the processing errors (a+b+c+d) may be larger than the height (e) of the shoulder 172. The processing errors may be complemented for based on how deep the thread 173 of the screw 170 is inserted into the nut 123. That is, if the processing errors have large values, the screw 170 is inserted into the nut 123 more shallowly. If the processing errors have small values, the screw 170 is inserted into the nut 123 more deeply.

In the display device 100 according to an exemplary embodiment of the present disclosure, the guide mold 160 may be securely fastened to the cover glass 110 by the plurality of screws 170. In addition, it is possible to greatly suppress the problem of foreign matter being introduced into the device via the gap created when the guide mold 160 is detached from the cover glass 110 to thereby prevent the reliability of the display panel 130 from being harmed. Advantages of exemplary embodiment of the present disclosure will be described in more detail with reference to FIGS. 6A and 6B.

Figure 6A:
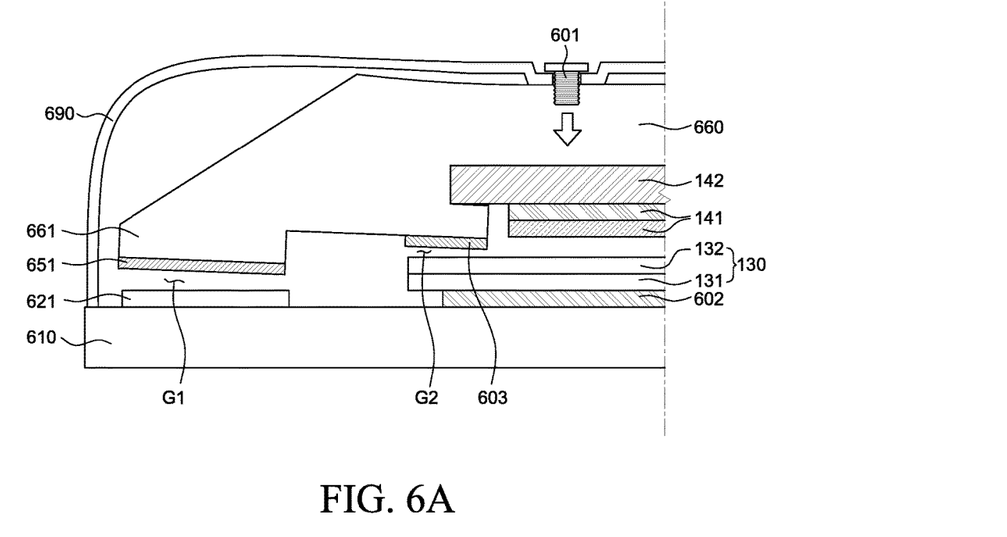
FIGS. 6A and 6B are cross-sectional views for illustrating advantages of a display device according to an exemplary embodiment of the present disclosure over a conventional display device.
Figure 6B:
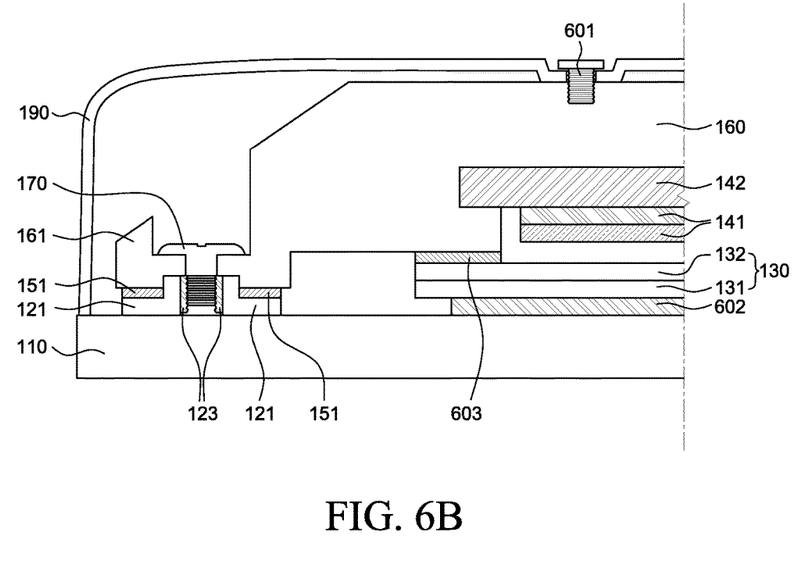

FIGS. 6A and 6B are cross-sectional views for illustrating advantages of the display device according to the exemplary embodiment of the present disclosure over conventional display devices. Specifically, FIG. 6A is a cross-sectional view for illustrating a defect caused by foreign matter as a guide mold 660 is detached from a cover glass 610 in a conventional display device. FIG. 6B is a cross-sectional view for illustrating how a defect caused by foreign matter can be prevented in the display device according to an exemplary embodiment of the present disclosure.

Referring to FIG. 6A, in a conventional display device, the guide mold 660 may be attached to the cover glass 610 by an adhesion member 651. That is, a bonding member 621 attached on the bottom surface of the cover glass 610 may be attached to a protruding portion 661 of the guide mold 660 by the adhesion member 651.

In addition, a PCB is disposed on the bottom surface of the guide mold 660, and a cover shield 690 is disposed to protect the PCB. The cover shield 690 is fastened to the guide mold 660 by the cover screw 601.

However, the cover screw 601 may be inserted into the guide mold 660 too deeply, such that stress may be exerted on a part of the guide mold 660. As the guide mold 660 is deformed by the stress by the cover screw 601, the protruding portion 661 may be detached from the bonding member 621. The display panel 130 may be attached to the inner side surface of the guide mold 660 by an adhesive tape 603. However, as the guide mold 660 is deformed, the adhesion by the adhesive tape 603 may also become weak. In particular, in a display device having a thin bezel, the area by which the protruding portion 661 attaches to the bonding member 621 is small, and the area by which the display panel 130 attaches to the inner side surface of the guide mold 660 is also small, such that they are detached from each other more frequently.

As a result, a fine gap G1 is created between the protruding portion 661 and the bonding member 621, and a fine gap G2 is created between the inner side surface of the guide mold 660 and the display panel 130. Foreign matter may be introduced via the gaps G1 and G2 and may permeate into the display panel 130 or may adhere to the surface of the optical sheets 141 of the backlight unit or the surface of the light guide plate 142, thereby causing a variety of problems such as degrading visibility of the display device.

In contrast, in the display device according to the exemplary embodiment of the present disclosure shown in FIG. 6B, the protruding portion 161 of the guide mold 160 is coupled with the non-recessed portion 121 of the bonding member 120 by the screw 170. Accordingly, even if stress is exerted on the guide mold 160 during the process of fastening the cover shield 190 to the guide mold 160 by a cover screw 601, it is possible to suppress the problem of the protruding portion 161 of the guide mold 160 being detached from the non-recessed portion 121 of the bonding member 120 by employing the screw 170. Therefore, introduction of foreign matter into the device can be suppressed. In particular, the screw 170 fastening the protruding portion 161 to the non-recessed portion 121 has a shoulder, and the surface of the thread of the screw 170 is spaced apart from the surface of the cover glass 110 facing the surface of the thread, such that the deformation of the guide mold 160 caused by the screw 170 can be suppressed. As a result, the reliability of the display device can be improved.

The exemplary embodiments of the present disclosure can also be described as follows:

According to an aspect of the present disclosure, a display device includes a display panel, a cover glass, a bonding member, a guide mold and a plurality of screws. The cover glass is disposed above the display panel. The bonding member is disposed on a surface of the cover glass and includes a plurality of non-recessed portions spaced apart from one another, area a plurality of recessed portions disposed between the plurality of non-recessed portions. The guide mold accommodates a light guide plate, an optical sheet and a light source unit below the display panel and includes a plurality of protruding portions protruding from a side surface thereof, each of protruding portions corresponding to the respective non-recessed portions. The plurality of screws each penetrates the respective protruding portions of the guide mold to be fastened to the respective recessed portions. As the display device according to the exemplary embodiment includes a plurality of screws for coupling the guide mold with the cover glass, the guide mold and the cover glass can be coupled with each other securely, and introduction of foreign matter caused when the guide mold is detached from the cover glass can be effectively suppressed.

The display device may further include: a filling member disposed between the guide mold and the bonding member, and the filling member may include first portions corresponding to the plurality of protruding portions and second portions connecting the first portions with one another.

The first portions may be made of an adhesive material for attaching the non-recessed portions to the protruding portions or an elastic material for filling gaps between the non-recessed portions and the protruding portions.

The display device may further include: a printed circuit board (PCB) disposed on a bottom surface of the guide mold; and a flexible printed circuit board (FPCB) connected to the display panel and configured to transmit a signal from the PCB to the display panel. The thickness of the non-recessed portions may be larger than the thickness of the recessed portions, and the FPCB may pass through between the non-recessed portions to be extended out of the bonding member.

The second portions of the filling member may be made of an elastic material for filling between the FPCB and the guide mold so that the FPCB is tightly attached to a surface of the bonding member.

The display device may further include: a cover shield configured to accommodate the PCB, and the cover shield may be fastened to the guide mold by a cover screw.

Each of the plurality of screws may include: a thread configured to be inserted into a respective one of the non-recessed portions; a shoulder connected to the thread; and a head connected to the shoulder, and the diameter of the head is larger than the diameter of the shoulder.

When the screws are fastened to the respective non-recessed portions, a surface of the thread may be spaced apart from a surface of the cover glass facing it.

Each of the plurality of recessed portions may include a nut into which the thread is screwed, and when the screws are inserted into the respective protruding portions, a distance from the bottom surface of the head of each of the screws to the surface of the nut facing it is larger than a height of the shoulder of each of the screws.

According to another aspect of the present disclosure, a display device includes a cover glass, a display panel, a backlight unit, and a plurality of screws. The display panel is disposed below the cover glass. The backlight unit is disposed below the display panel. The plurality of screws penetrates a guide mold of the backlight unit to be fastened to a bonding member disposed on a bottom surface of the cover glass. The guide mold includes a plurality of protruding portions protruding from a side surface thereof so that the screws are inserted thereinto.

The display panel may include a FPCB configured to transmit signals to the display panel, and the display panel may be accommodated in the guide mold, and the FPCB may pass through between the protruding portions and may be extended out of the guide mold.

The display device may further include: a filling member disposed between the guide mold and the bonding member, and the filling member is configured to tightly attach the FPCB of the display panel to a surface of the cover glass.

Thus far, exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The technical idea of the present disclosure is not limited by the exemplary embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A display device comprising:
   a display panel;
   a cover above the display panel;
   a bonding member on a surface of the cover and comprising a plurality of non-recessed portions spaced apart from one another and a plurality of recessed portions between the plurality of non-recessed portions;
   a guide mold configured to accommodate a light source below the display panel and comprising a plurality of protruding portions protruding from a side surface thereof, each of the plurality of protruding portions corresponding respectively to each of the plurality of non-recessed portions; and
   at least one first fastening member penetrating a corresponding one of the plurality of protruding portions of the guide mold to be fastened to a corresponding one of the plurality of non-recessed portions.

2. The display device of claim 1, further comprising:
   a filling member disposed between the guide mold and the bonding member,
   wherein the filling member comprises first portions corresponding to the plurality of protruding portions and second portions connecting the first portions with one another.

3. The display device of claim 2, wherein the first portions comprise an adhesive material for respectively attaching each of the plurality of non-recessed portions to each of the plurality of protruding portions or an elastic material for filling gaps between the plurality of non-recessed portions and the plurality of protruding portions.

4. The display device of claim 2, further comprising:
   a printed circuit board (PCB) on a bottom surface of the guide mold; and
   a flexible printed circuit board (FPCB) connected to the display panel and configured to transmit a signal from the PCB to the display panel,
   wherein the display panel is disposed on an inner side of the bonding member,
wherein a thickness of the plurality of non-recessed portions is larger than a thickness of the plurality of recessed portions, and the FPCB passes through between the plurality of recessed portions to extend out of the display panel.

5. The display device of claim 4, wherein the second portions of the filling member comprise an elastic material for filling a space between the FPCB and the plurality of recessed portions to tighten the FPCB to a surface of the plurality of recessed portions.

6. The display device of claim 4, further comprising: a cover shield configured to accommodate the PCB, wherein the cover shield is fastened to the guide mold by a second fastening member.

7. The display device of claim 1, wherein the at least one first fastening member comprises:
   a thread configured to be inserted into the corresponding one of the plurality of non-recessed portions;
   a shoulder connected to the thread; and
   a head connected to the shoulder,
   wherein a diameter of the head is larger than a diameter of the shoulder.

8. The display device of claim 7, wherein when the at least one first fastening member is fully fastened to the corresponding one of the plurality of non-recessed portions, a surface of the thread facing the cover is spaced apart from a surface of the cover facing the thread.

9. The display device of claim 8, wherein the corresponding one of the plurality of non-recessed portions comprises a nut into which the thread is screwed, and
   wherein when the at least one first fastening member is fully inserted into the corresponding one of the plurality of protruding portions, a minimum distance between the head and the nut is greater than a minimum distance between the head and the thread.

10. A display device comprising:
    a cover;
    a display panel under the cover, including a flexible printed circuit board (FPCB) extending outward from one side of the display panel;
    a bonding member under the cover surrounding the display panel, comprising one side with alternating recessed portions and non-recessed portions; and
    a guide mold under the bonding member surrounding a light source, the guide mold comprising a first top surface of one side having a lower height than a second top surface contacting a bottom surface of the bonding member, the one side including alternating protruding portions and non-protruding portions,
    wherein the non-recessed portions of the bonding member correspond with the protruding portions of the guide mold, and
    wherein the recessed portions of the bonding member correspond with the non-protruding portions of the guide mold.

11. The display device of claim 10,
    wherein the flexible printed circuit board (FPCB) includes extensions extending outward from the display panel through gaps resulting from a step difference between the recessed portions and the non-recessed portions of the bonding member.

12. The display device of claim 11, further comprising:
    a printed circuit board (PCB) under the light source and connected to the extensions of the FPCB, the PCB being configured to transmit signals to the display panel through the FPCB extensions.

13. The display device of claim 10, wherein the first portions of the filling member comprise an adhesive material or an elastic material.

14. The display device of claim 10, wherein the second portions of the filling member comprise an elastic material.

15. The display device of claim 1,
    wherein the plurality of non-recessed portions and the plurality of recessed portions are on one side of the bonding member, and
    wherein each end of the one side comprises a non-recessed portion of the plurality of non-recessed portions.

16. The display device of claim 1, wherein the at least one fastening member comprises a non-adhesive material.

17. The display device of claim 10, further comprising a filling member between the first top surface of the guide mold and the bottom surface of the bonding member, the filling member comprising first portions extending outward and second portions between the first portions, wherein the non-recessed portions of the bonding member and the protruding portions of the guide mold correspond with the first portions of the filling member, and
wherein the recessed portions of the bonding member and the non-protruding portions of the guide mold correspond with the second portions of the filling member.

* * * * *